(12) United States Patent
Fu et al.

(10) Patent No.: US 9,697,308 B2
(45) Date of Patent: Jul. 4, 2017

(54) SYSTEM AND METHOD FOR GENERATING AN ELECTROMAGNETIC FIELD MODEL

(71) Applicant: The Hong Kong Polytechnic University, Kowloon, Hong Kong (CN)

(72) Inventors: Weinong Fu, Hong Kong (CN); Xiu Zhang, Hong Kong (CN); Siu-Iau Ho, Hong Kong (CN)

(73) Assignee: The Hong Kong Polytechnic University Innovation and Technology Development Office, Hung Hom, Kowloon, Hong Kong (CN)

( * ) Notice: Subject to any disclaimer, the term of this patent is extended or adjusted under 35 U.S.C. 154(b) by 0 days.

(21) Appl. No.: 13/861,795

(22) Filed: Apr. 12, 2013

(65) Prior Publication Data
US 2014/0309979 A1 Oct. 16, 2014

(51) Int. Cl.
*G06F 17/50* (2006.01)
*H03H 17/02* (2006.01)
(Continued)

(52) U.S. Cl.
CPC ......... *G06F 17/5018* (2013.01); *H03H 17/02* (2013.01); *G06F 17/12* (2013.01); *G06F 2217/16* (2013.01); *H01P 1/2138* (2013.01)

(58) Field of Classification Search
None
See application file for complete search history.

(56) References Cited

U.S. PATENT DOCUMENTS

| 5,774,360 | A | * | 6/1998 | Xiao et al. | 702/6 |
| 7,502,690 | B2 | * | 3/2009 | Thomsen et al. | 702/2 |

(Continued)

OTHER PUBLICATIONS

R. Martin, "Development and Application of 2D and 3D Transient Electromagnetic Inverse Solutions Based on Adjoint Green Functions: A Feasibility Study for the Spatial Reconstruction of Conductivity Distributions by Means of Sensitivities." Doctoral Dissertation, University of Cologne, Cologne Germany, 2009, 233 pages.*

(Continued)

*Primary Examiner* — Aniss Chad
*Assistant Examiner* — David M Rogers
(74) *Attorney, Agent, or Firm* — Leydig, Voit & Mayer, Ltd.

(57) ABSTRACT

A method for generating an EMF model includes establishing a time-domain finite data model associated with an electric device representing the electric device in the time-domain; utilizing the time domain finite data model, determining excitations representing an electrical characteristic of an electrical components of the electric device; and generating an EMF model by processing the excitations with a transformation routine determining an approximate representation of an EMF generated by the electric device. A system for generating the EMF model includes a modelling module establish a time-domain finite data model associated with the electric device and d representing the electric device in the time-domain. The modelling module utilizes the time domain finite data model to determine excitations representing an electrical characteristic of an electrical component of the electric device. The system includes a processing module generating an EMF model by processing the excitations with a transformation routine.

14 Claims, 16 Drawing Sheets

(51) Int. Cl.
  *H01P 1/213* (2006.01)
  *G06F 17/12* (2006.01)

(56) References Cited

U.S. PATENT DOCUMENTS

| 8,584,586 | B1* | 11/2013 | Pugsley et al. | 102/402 |
| 8,976,896 | B2* | 3/2015 | McCallister et al. | 375/297 |
| 2003/0204343 | A1* | 10/2003 | Yamamoto et al. | 702/65 |
| 2007/0188177 | A1* | 8/2007 | Troxler et al. | 324/643 |
| 2008/0272716 | A1* | 11/2008 | Yu et al. | 318/135 |

OTHER PUBLICATIONS

L. Xu, et al, "Evaluation of Third Harmonic Component Effects in Five-Phase Synchronous Reluctance Motor Drive Using Time-Stepping Finite-Element Method," IEEE Transactions on Industry Applications, vol. 38, No. 3, May/Jun. 2002, pp. 638-644.*

Micheal Zeltkevic, "Forward and Backward Euler Methods," Massachusetts Institute of Technology, http://web.mit.edu/10.001/Web/Course_Notes/Differential_Equations_Notes/node3.html (Apr. 15, 1998 / Jan. 12, 2001 on Wayback), 5 pages.*

R. Vahldieck, "Electromagnetic Modeling" Wiley Encyclopedia of Electrical and Electronics Engineering. J. Webster (ed.), Wiley & Sons, 1999, pp. 450-464.*

P. Debicki, et al., "Coping with numerical complexity in computational electromagnetics." In Microwaves and Radar, MIKON'98., 12th International Conference on, IEEE, vol. 4, 1998, pp. 175-197.*

E. Dautbegovic, "Transient Simulation of Complex Electronic Circuits and Systems Operating at Ultra High Frequencies," PhD. Thesis, Dublin City University, School of Electronic Engineering, 2005, 261 pages.*

J. Pender, et al., "New Square Wave Transform for Digital Signal Processing," IEEE Transactions on Signal Processing, vol. 40, No. 8, Aug. 1992, pp. 2095-2097.*

S.W. Smith "The Scientist and Engineer's Guide to Digital Signal Processing," California Technical Publishing, 1997, pp. 87-106. (Also included in PDF are title and copyright pages.).*

* cited by examiner

SYSTEM AND METHOD FOR GENERATING AN ELECTROMAGNETIC FIELD MODEL

TECHNICAL FIELD

The present invention relates to a system and method for generating an electromagnetic field (EMF) model, and particularly, although not exclusively, to a system and method for EMF Computation of Electric Devices.

BACKGROUND

In designing electric devices of different structures, electromagnetic field (EMF) computation and modelling are usually adopted to simulate the electrical characteristics of different components in the electric devices so as to optimize the structures with different design parameters, and to predict the performance of the electric devices. Simulation and modelling tools are provides manufacturers and researchers preliminary figures before the actual fabrication of the electric devices, in other words, minimizing failure rate and production cost in the design phase of the electric devices.

Numerical methods of electromagnetic field computation of electric devices are basic tools to study the relationships of physical quantities in those devices. They do not only simply analyze the performance of the systems being studied, they can also provide foundations for the finding of optimal designs.

SUMMARY OF THE INVENTION

In accordance with a first aspect of the present invention, there is provided a method for generating an EMF model for an electric device comprising the steps of:
  establishing a time-domain finite data model associated with the electric device, wherein the time-domain finite data model is arranged to define a basic system representation of the electric device in time-domain; domain;
  utilizing the time domain finite data model to determine a plurality of excitations arranged to represent an electrical characteristics of one or more electrical components of the electric device; and
  generating an EMF model by processing the plurality of excitations with a transformation routine arranged to determine an approximate representation of an EMF generated by the electric device.

In an embodiment of the first aspect, wherein the transformation routine is dependent on an association between the plurality of excitation and the EMF generated by the electric device.

In an embodiment of the first aspect, wherein a time-domain solution is obtained by using a time-stepping finite-element function.

In an embodiment of the first aspect, the method further comprising the step of:
  generating an initial-value problem in time-domain arranged to represent the basic system representation of the electric device in time-domain.

In an embodiment of the first aspect, the method further comprising the step of:
  discretizing at least one time variable in the initial-value problem with a time step, wherein the at least one time variable is discretized to obtain a plurality of discretized time variable of successive time stamps associated with the time step.

In an embodiment of the first aspect, the method further comprising the step of:
  obtaining a recursive formula associated with the initial-value problem and the discretized time variable.

In an embodiment of the first aspect, wherein the initial-value problem is obtained by using backward Euler method.

In an embodiment of the first aspect, the method further comprising the step of:
  establishing a system matrix equation in accordance with the recursive formula.

In an embodiment of the first aspect, the method further comprising the step of:
  factorizing a coefficient matrix of the system matrix equation to obtain a factorized coefficient matrix.

In an embodiment of the first aspect, the method further comprising the step of:
  substituting the factorized coefficient matrix into the system matrix equation to obtain a solution of a particular time stamp.

In an embodiment of the first aspect, the method further comprising the step of:
  updating the system matrix equation by replacing a plurality of discretized time variable to a plurality of corresponding discretized time variable of succeeding time stamp; and
  obtaining a solution of the succeeding time stamp.

In an embodiment of the first aspect, the method further comprising the step of:
  obtaining general formulae of the electrical component, of the electric device.

In an embodiment of the first aspect, the method further comprising the step of:
  replacing at least one frequency variable of the general formulae to obtain different results under different frequencies.

In an embodiment of the first aspect, wherein the excitation represented by a unit step function.

In an embodiment of the first aspect, wherein the EMF generated by the electric device is associated with sinusoidal excitations.

In an embodiment of the first aspect, wherein a required time and an accuracy of generating an EMF model for an electric device are arranged to be controlled by replacing the time step with a different time step.

In accordance with a second aspect of the present invention, there is provided a system for generating an EMF model for an electric device comprising:
  a modelling module arranged to establish a time-domain finite data model associated with the electric device, wherein the tine-domain finite data model is arranged to define a basic system representation of the electric device in time-domain; wherein the modelling module is further arranged to utilize the time domain finite data model to determine a plurality of excitations arranged to represent an electrical characteristics of one or more electrical components of the electric device; and
  a processing module arranged to generate an EMF model by processing the plurality of excitations with a transformation routine arranged to determine an approximate representation of an EMF generated by the electric device.

In an embodiment of the second aspect, wherein the transformation routine is dependent on an association between the plurality of excitation and the EMF generated by the electric device.

In an embodiment of the second aspect, wherein a time-domain solution is obtained by using a time-stepping finite-element function.

In an embodiment of the second aspect, wherein the processing module is further arranged to obtain general formulae of the electrical component of the electric device, and wherein the processing module is further arranged to replace at least one frequency variable of the general formulae to obtain different results under different frequencies.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
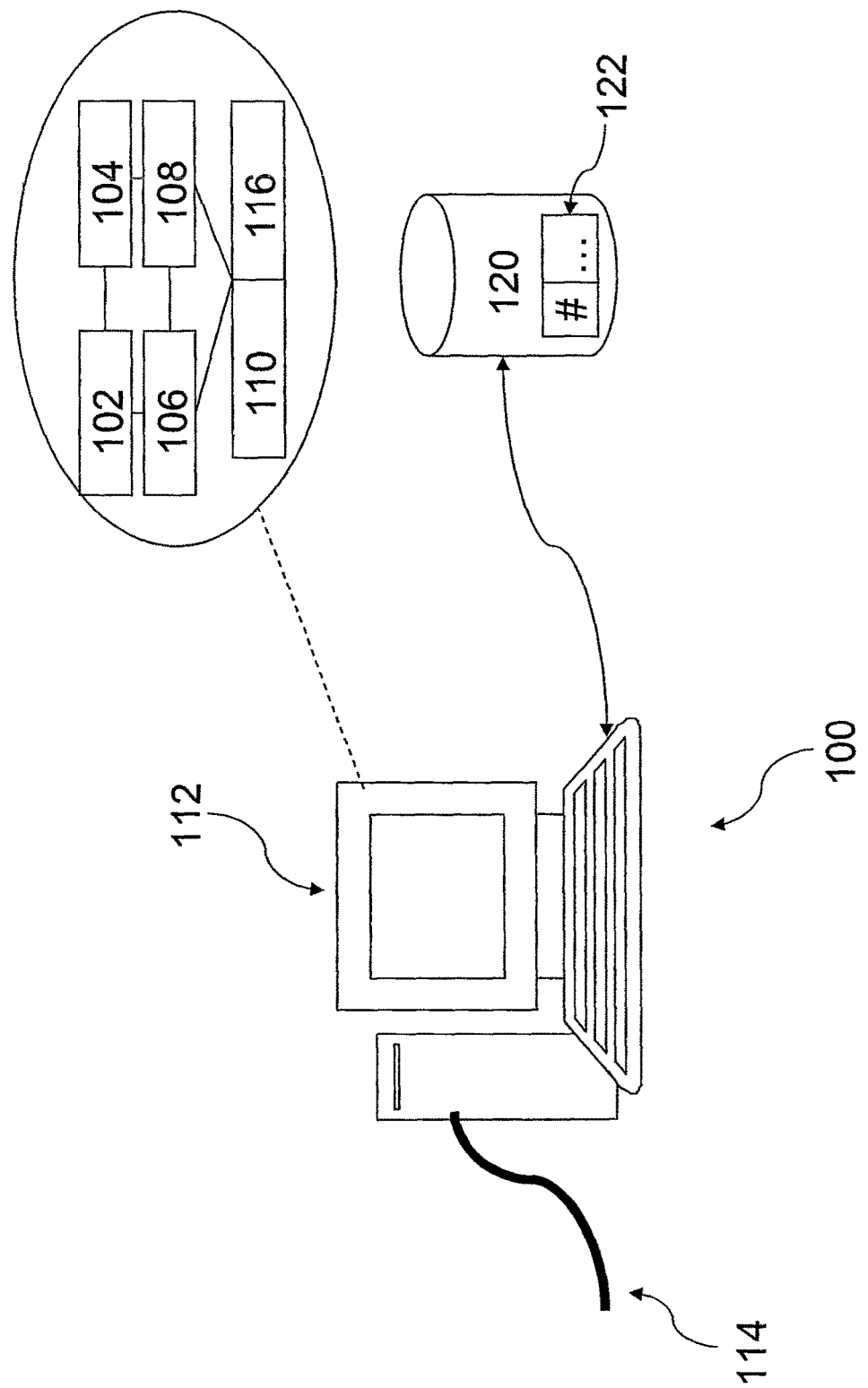
FIG. 1 is a schematic diagram of a central transfer system with one embodiment of the present invention.

The inventors have, through their own research, trials and experiments, devised that, if the system is linear with sinusoidal excitations and only steady-state solutions are expected, a frequency-domain finite-element method (FEM) is usually used, because the system matrix equation needs to be solved once only. If the performance at different operating frequencies is to be evaluated, then frequency sweeping method can be used. When the excitations are not sinusoidal functions, Fourier decomposition method is used to obtain the various harmonics of the excitations and the frequency-domain solutions for different harmonics can be added together according to the principle of linear superposition.

From the research of the inventors on wireless power transfer system, the aforementioned topic has become a very topical research subject. If the resonant frequencies of the transmitter coil and the receiver coil are the same as that of the voltage source, and also if the system is in a strong-coupling regime, then electric power can be efficiently transferred from the transmitter coil to the receiver coil even if their physical separation distance is larger than 2-3 times of their physical dimensions. Such resonant circuit has many potential applications such as, for example, in wirelessly charging of mobile phones, laptops, and deep brain stimulation (DBS) in medical applications. The magnetic resonant coupling phenomenon is explained using a coupled mode theory. However, most engineers in electrical engineering are not familiar with such approach. On the other hand, it is well-known that all electromagnetic phenomena of macro systems can be described using Maxwell's electromagnetic field equations, thus numerical methods of electromagnetic field computation, such as FEM, method of moments (MoM), Monte Carlo method, finite difference method (FDM), finite volume method (FVM), etc., are in a better position for engineers to appreciate and analyze, quantitatively, the performance of wireless power transfer systems. Indeed, numerical methods for solving Maxwell's equations have been applied successfully to study a wealth of problems in science and engineering. For the wireless power transfer application, one typically needs to evaluate the performance of the power transfer system at different operating frequencies. It is also necessary to find the resonant frequency of the designed system. When the transmitter coil and the receiver coil are constructed from planar spiral inductor and distributed capacitances are used to compensate for the inductances, FEM is a very useful technique to predict the system performance, find the resonant frequency and hence optimize the design parameters of the coils. To address these problems, frequency sweeping method is commonly used. For each operating frequency, the electromagnetic field problem however needs to be solved once, which implies that many field problems in frequency-domain at different operating frequencies need to be solved repeatedly. Such algorithm is therefore time-consuming and this, in turn, limits the application of numerical methods in the study of these areas.

With reference to FIG. 1, an embodiment of the present invention is illustrated. This embodiment is arranged to provide a system for generating an EMF model, comprising: a modelling module arranged to establish a time-domain finite data model associated with the electric device, wherein the time-domain finite data model is arranged to define a basic system representation of the electric device in time-domain; wherein the modelling module is further arranged to utilize the time domain finite data model to determine a plurality of excitations arranged to represent an electrical characteristics of one or more electrical components of the electric device; and a processing module arranged to generate an EMF model by processing the plurality of excitations with a transformation routine arranged to determine an approximate representation of an EMF generated by the electric device.

In this embodiment, the modelling module and the processing module are implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is a shown a schematic diagram of a central transfer system which in this embodiment comprises a server 100 arranged to operate, at least in part if not entirely, the system in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100. Alternatively, the database 120 may also be implemented as a stand-alone database system in communication with the server 100 via an external computing network, or other types of communication links.

Preferably, the method for generating an EMF model for an electric device includes the use a series of simple excitations to substitute an electrical characteristic of one or more electrical components of the electric device. Preferably, these electrical characteristics may be a sinusoidal excitation, and alternatively these characteristics may be in other form of excitations. The method for generating an EMF model comprises the steps of: establishing a time-domain finite data model associated with the electric device, wherein the time-domain finite data model is arranged to define a basic system representation of the electric device in time-domain; utilizing the time domain finite data model to determine a plurality of excitations arranged to represent an electrical characteristics of one or more electrical components of the electric device; and generating an EMF model by processing the plurality of excitations with a transformation routine arranged to determine an approximate representation of an EMF generated by the electric device.

In an example embodiment, a plurality of excitations represents an electrical characteristic of one or more electrical components of an electric device. As a non-limiting example, the excitations are simple excitations or the unit step functions of voltage sources or current sources, together with the initial currents in inductors and initial voltages in the capacitors. In this example embodiment, the two basic steps of the method for generating and EMF model are: a) obtain the basic solutions of the simple excitations in time-domain; b) calculate the solutions of sinusoidal excitations in accordance to the relationship of sinusoidal excitations and simple excitations.

In an alternative embodiment, for simplicity without losing generality, a wireless power transfer system is used as an example; and the following description assumes there is only one excitation in the system.

As the rectifier circuit in the wireless power transfer system can be studied separately, the wireless power transfer system is considered as a linear system. The procedures to obtain the frequency-domain solutions are described in the following steps:

In the first step, a time-domain finite data model, preferably a time-domain finite-element model of the magnetic field coupling with electric circuit, is established. The original sinusoidal voltage source is replaced by a unit step function.

The time-domain solution is obtained using time-stepping FEM. Because of the existence of eddy current, the basic system equations in time-domain, or the basic system representation in time-domain, which is a transient magnetic field-electric circuit coupled problem, can be expressed as the following initial-value problem in time-domain:

$$[C]\{x\} + [D]\left\{\frac{dx}{dt}\right\} = \{P\}, x(t_0) = x_0, t \in [t_0, t_{end}], \quad (1)$$

where; x is a variable column matrix, which contains magnetic field potentials and currents in the electric circuit; the variable x is solved from time $t_0$ to time $t_{end}$ ($t_{end}$ is large enough such that at the time $t_{end}$, the solution is assumed to have reached its steady-state); the matrix D is an appropriately sized constant matrix associated both with the eddy-current regions in the magnetic field and energy-storage elements such as inductors and capacitors in the electric circuit. The coefficient matrix C in general is a constant in linear systems. The right-hand column matrix P is associated with excitations such as voltage sources and current sources.

The time variable in (1) can be discretized using backward Euler method. The recursive formula of (1) when using the backward Euler method is:

$$[C]\{x_k\} + [D]\left\{\frac{x_k - x_{k-1}}{\Delta t}\right\} = \{P(t_k)\}, \quad (2)$$

where $x_k$ and $x_{k-1}$ are the respective solutions at time $t_k$ and $t_{k-1}$, respectively; and the time step size $\Delta t = t_k - t_{k-1}$.

Figure 2:
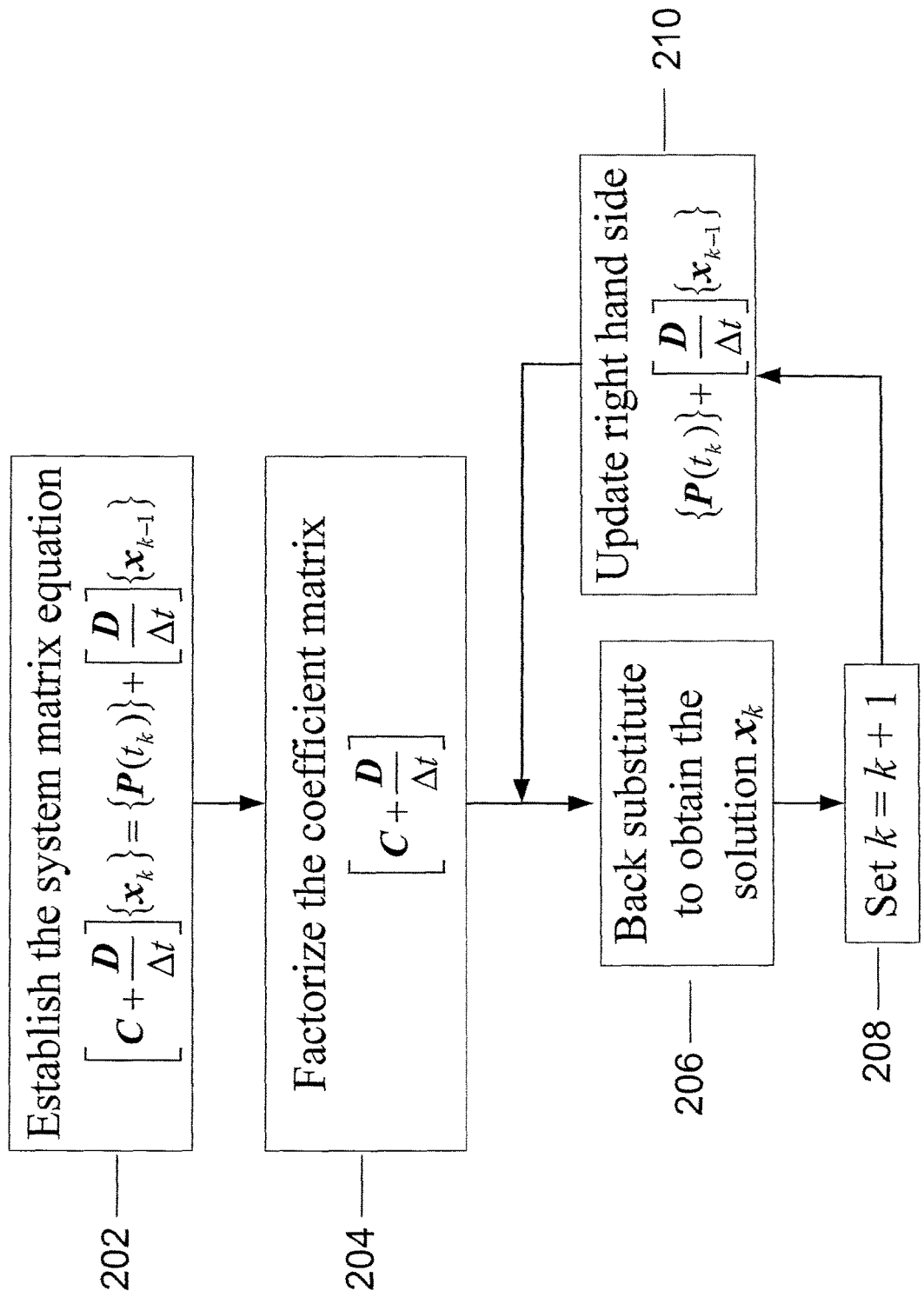
FIG. 2 is a flowchart with one embodiment of the present invention.

With reference to FIG. 2, in step 202, Equation (2) is solved by using time-stepping method in time-domain. According to (2), at each time step the following algebraic matrix equation is solved:

$$\left[C + \frac{D}{\Delta t}\right]\{x_k\} = \{P(t_k)\} + \left[\frac{D}{\Delta t}\right]\{x_{k-1}\}. \quad (3)$$

At the first time step the coefficient matrix $$\left[C + \frac{D}{\Delta t}\right]$$

of the system matrix equation is factorized once and once only in step 204. In the successive time steps (steps 206, 208 and 210), significant computing time is saved because only back substitution is used to obtain the solution at each step as shown in FIG. 2.

After the time-domain FEM solution is obtained by solving (3), the response of the unit step function excitation is saved as the base solution. In the following steps no further FEM computation is required again.

Figure 3:
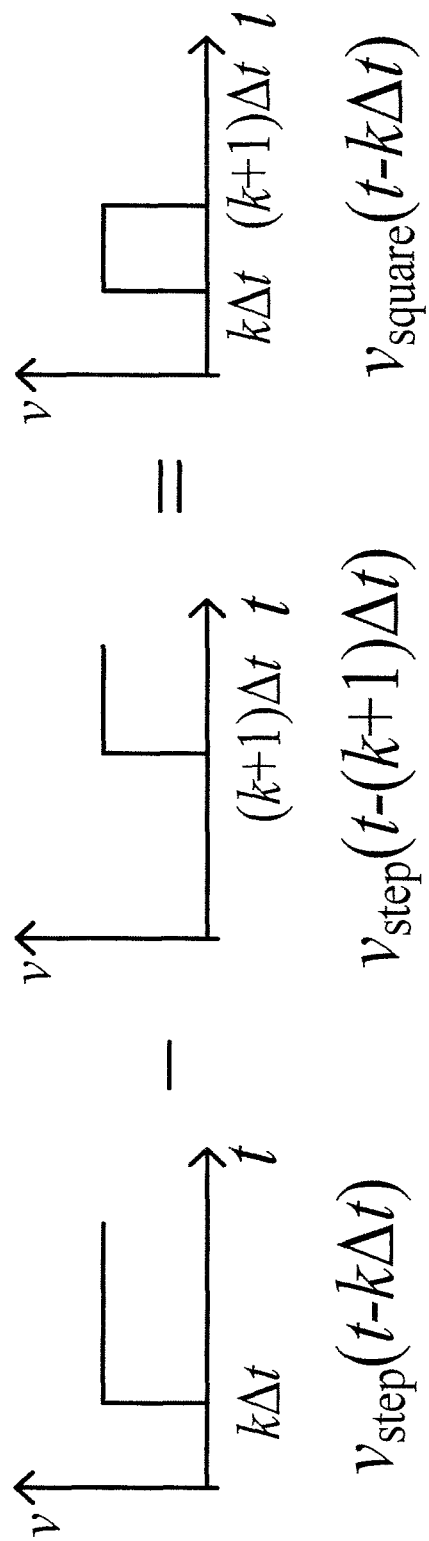
FIG. 3 is a schematic diagram illustrating a derivation of a square wave function from the subtraction of two step functions.

The second step is to process the excitations with a transformation routine. In an example embodiment, to obtain the transformation relationship between the sinusoidal function and the unit step function. As shown in FIG. 3, a square wave function $v_{square}(t-k\Delta t)$ is equal to the subtraction of two step functions $v_{step}(t-k\Delta t)$ and $v_{step}(t-(k+1)\Delta t)$, that is, $$v_{square}(t-k\Delta t)=v_{step}(t-k\Delta t)-v_{step}(t-(k+1)\Delta t), \quad (4)$$

where the time step size $\Delta t$ is used as the wave width of the square wave function.

Figure 4:
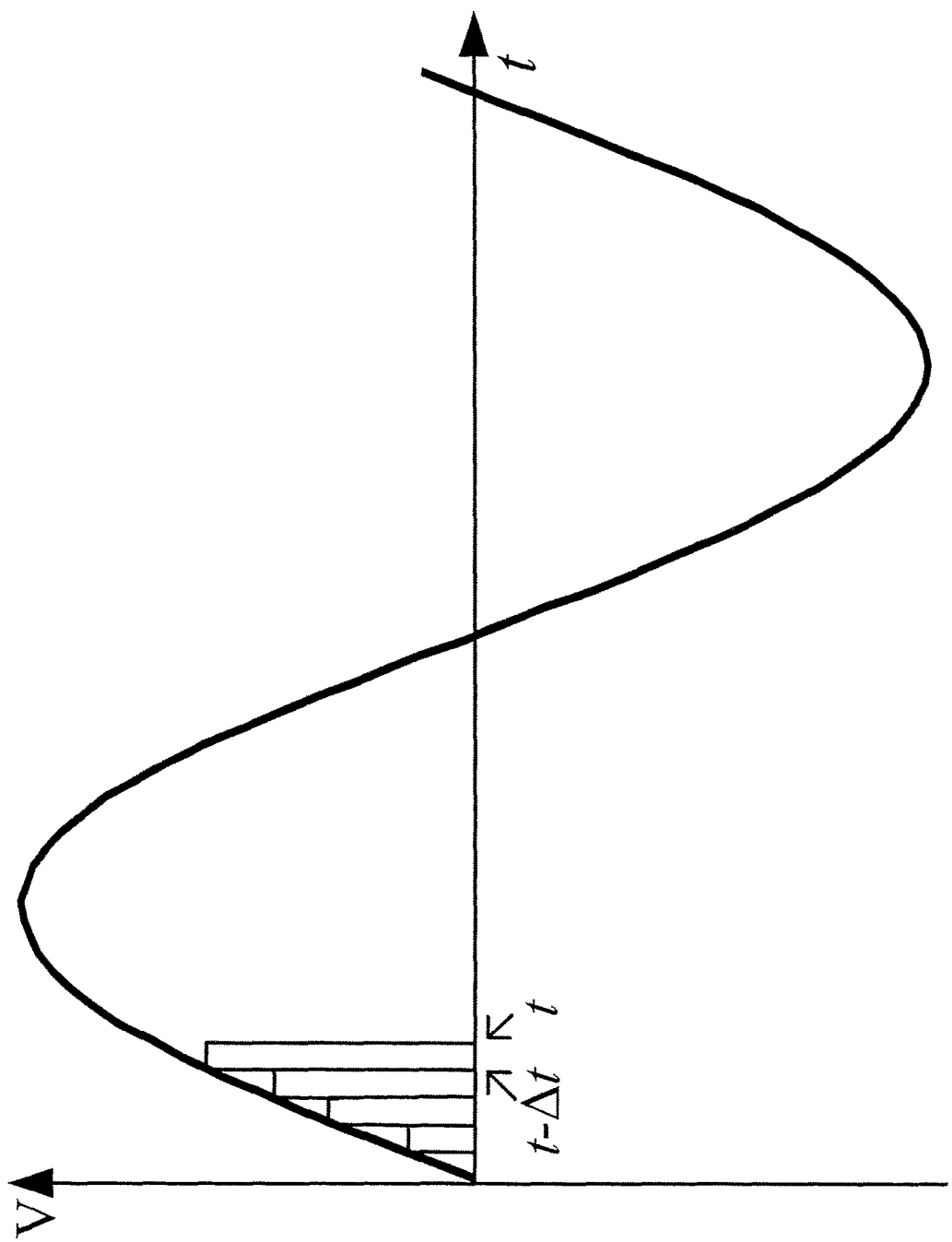
FIG. 4 is a schematic diagram illustrating a synthesis of a sinusoidal function from a plurality of square functions.

In a like manner, as shown in FIG. 4, a sinusoidal source $v_{sin}(t)=\sin(\omega t)$ is approximately equal to the addition of many stop functions with different amplitudes:

$$v_{sin}(t) \approx \sum_{k=0}^{K} [\sin(\omega k \Delta t) v_{square}(t-k\Delta t)], \quad (5)$$

where $\omega$ is the angular frequency. If the time step size $\Delta t$ is small enough, this approach is a very accurate representation of the actual system.

Because the solution of the step function is already known from the time-domain FEM, then according to the principle of linear superposition, the solution of the sinusoidal source excitation can also be quickly obtained by addition and subtraction operations of the solutions of the step functions.

Preferably, the main purpose is to obtain the resonant frequency of the circuit. According to the aforementioned two steps, it is easy to obtain the current response to the sinusoidal source excitation for a specific frequency. One just needs to change the value of $\omega$ (5) to obtain different results under different frequencies. From the results of the wireless power transfer system being studied, the frequency at which the current response reaches its maximum value is the resonant frequency of the system. With the algorithm as described in the example embodiment, one only needs to compute the resonator frequency of the system using FEM once and only once. This is obvious a very distinctive merit as the conventional method will require the use of time consuming FEM computation for each and every frequency throughout its frequency sweeping analysis.

Based on the above method for generating an EMF model, the other method can also be deduced as followed:
According to convolution theorem, any output $i(t)$ of a linear system can also be expressed by the convolution of its input $v_s(t)(t \geq 0)$ and its impulse response $h(t)$:

$$i(t)=\int_0^\infty v_k(t-\tau)u(t-\tau)h(\tau)d\tau. \quad (6)$$

where $u(t-\tau)$ is the step function. We will still use the step function response $s(t)$ to replace the impulse response $h(t)$. Substituting (3) into (6), we have $$i(t) = \int_0^\infty v_s(t-\tau)u(t-\tau)\frac{ds(\tau)}{d\tau}d\tau. \quad (7)$$

According to the principle of integration by parts, $$i(t) = v_s(t-\tau)u(t-\tau)s(\tau)\Big|_{\tau=0}^{\tau=\infty} - \int_0^\infty s(\tau)\frac{d[v_s(t-\tau)u(t-\tau)]}{d\tau}d\tau. \quad (8)$$

If the voltage source is $v_s(t)=V_{sm}\sin(\omega t)u(t)$, we have $$i_{sin}(t)=v_s(t-\tau)u(t-\tau)s(\tau)|_{\tau=0}^{\tau=\infty}+\int_0^\infty s(\tau)V_{sm}\omega\cos\omega(t-\tau)u(t-\tau)d\tau. \quad (9)$$

Advantageously, when the base solution of step function excitation is computed, the time step size can be different. At the beginning of the time stepping, the solution has quick change, the time step size should be small. When the solution is near steady-state, the time step size can be large. Therefore, total computing time can be reduced.

Optionally, depending on the accuracy required, any numerical integration method can be used to perform the integration in (9). Therefore the new formula as described in the preferred embodiment is more general and more flexible to be implemented in computer programs.

Advantageously, the system is able to obtain all frequency-domain solutions with different operating frequencies based only on one or at most a few time-domain solutions. The method for generating an EMF model is very fast and its algorithm is also simple. Depending on the number of excitations, only one or a few solutions need to be solved in time-domain. More specifically, if there are N excitations, only N solutions in time-domain are required. All solutions in frequency-domain with different frequencies can be easily and quickly synthesized by simple addition and subtraction operations. In order to reduce the background computing time for the time-domain solutions, the coefficient matrix of the system matrix equation is factorized once, and only once, at the first time step during time stepping FEM. In all successive steps only back substitution is required to obtain the solutions for different right-hand terms, consequently the computing time for time-domain solutions is reduced very substantially.

Advantageously, the method for generating an EMF model is very versatile as it is applicable in general to any linear systems.

Figure 5:
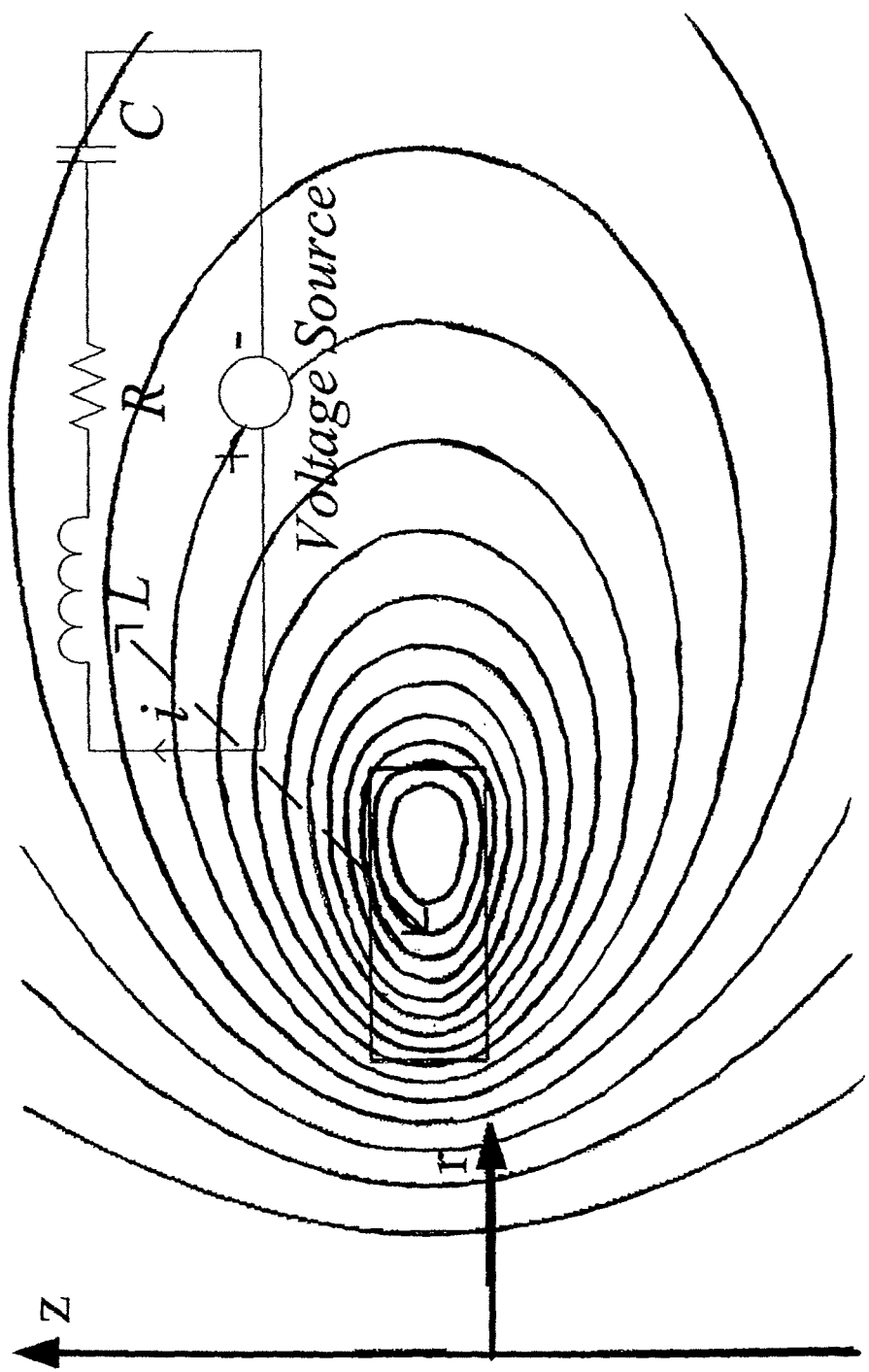
FIG. 5 is a schematic diagram illustrating a circular coil, a coupling circuit and an associated magnetic field.

In yet another embodiment, a simple example is used to test the method for generating an EMF model in finding its resonance frequency as its analytical solution is known to allow simple and straightforward comparison. This example consists of a coil with stranded copper wires (with negligible eddy-current effect) which is connected in series with a resistor and a capacitor. The rectangular object in FIG. 5 depicts the cross section surface of the circular coil in cylindrical coordinate system (r-z coordinates) and the parameters of the coil are given in Table I. The resistor and capacitor are connected in series in the electric circuit as shown in FIG. 5. In the FEM analysis, there are 10219 second-order triangular elements in the solution domain.

TABLE I

PARAMETERS OF THE CIRCULAR COIL

| | |
|---|---|
| Inner radius of the circular coil | 0.4 mm |
| Number of layers | 10 |
| Number turns per layer | 5 |
| Height of the coil | 0.2 mm |
| Width of the coil | 0.4 mm |
| Cross-sectional area of the coil | 0.08 mm$^2$ |
| Radius of copper wire | 0.04 mm |
| Conductivity of copper wire | 5.8 × 10$^6$ S/m |
| Inductance (L) | 12.18 μH |
| Compensating capacitance (C) | 83.182 pF |
| Resistance (R) | 10 Ω |
| Resonant frequency ($1/2\pi\sqrt{LC}$) | 5.0 MHz |

TABLE II

NUMERICAL ERROR BETWEEN THE METHOD FOR GENERATING AN EMF MODEL AND CONVENTIONAL METHOD WHEN USING DIFFERENT TIME STEP SIZES

| Time step size (μs) | Numerical error |
|---|---|
| 1.0 × 10$^{-3}$ | 10.14% |
| 1.0 × 10$^{-4}$ | 0.41% |

TABLE II-continued

NUMERICAL ERROR BETWEEN THE METHOD FOR GENERATING AN EMF MODEL AND CONVENTIONAL METHOD WHEN USING DIFFERENT TIME STEP SIZES

| Time step size (µs) | Numerical error |
| --- | --- |
| $1.0 \times 10^{-5}$ | 0.40% |
| $1.0 \times 10^{-6}$ | 0.39% |

TABLE III

COMPARISON OF RESULTS OF THE METHOD FOR GENERATING AN EMF MODEL AND CONVENTIONAL METHOD

| | Conventional method | Current method | Difference |
| --- | --- | --- | --- |
| Resonant frequency | 5.0 MHz | 5.0 MHz | 0.0% |
| Current amplitude | 99.85 mA | 99.46 mA | 0.39% |

Figure 6:
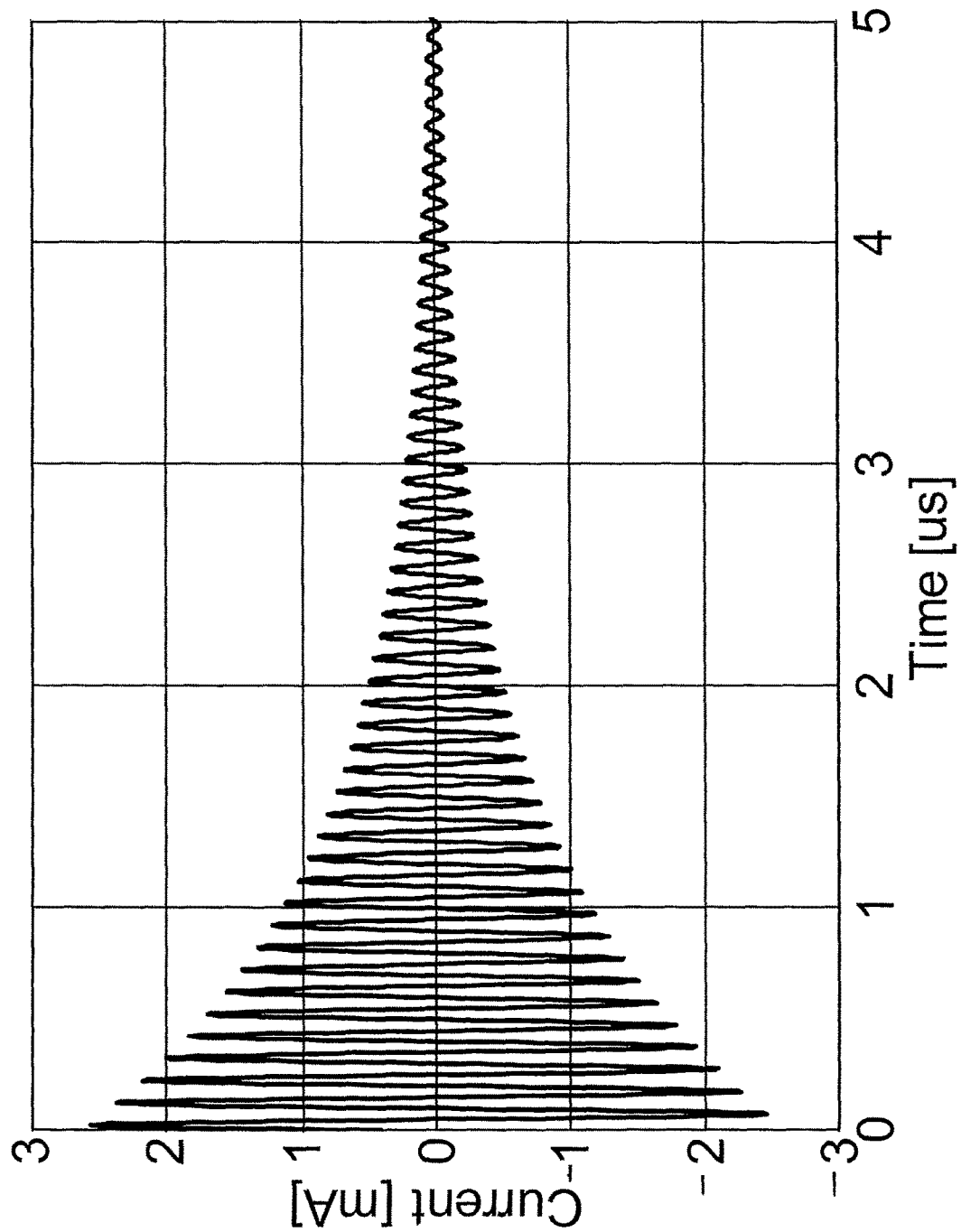
FIG. 6 is a plot showing a step function response of the structure in accordance with FIG. 5.
Figure 7A:
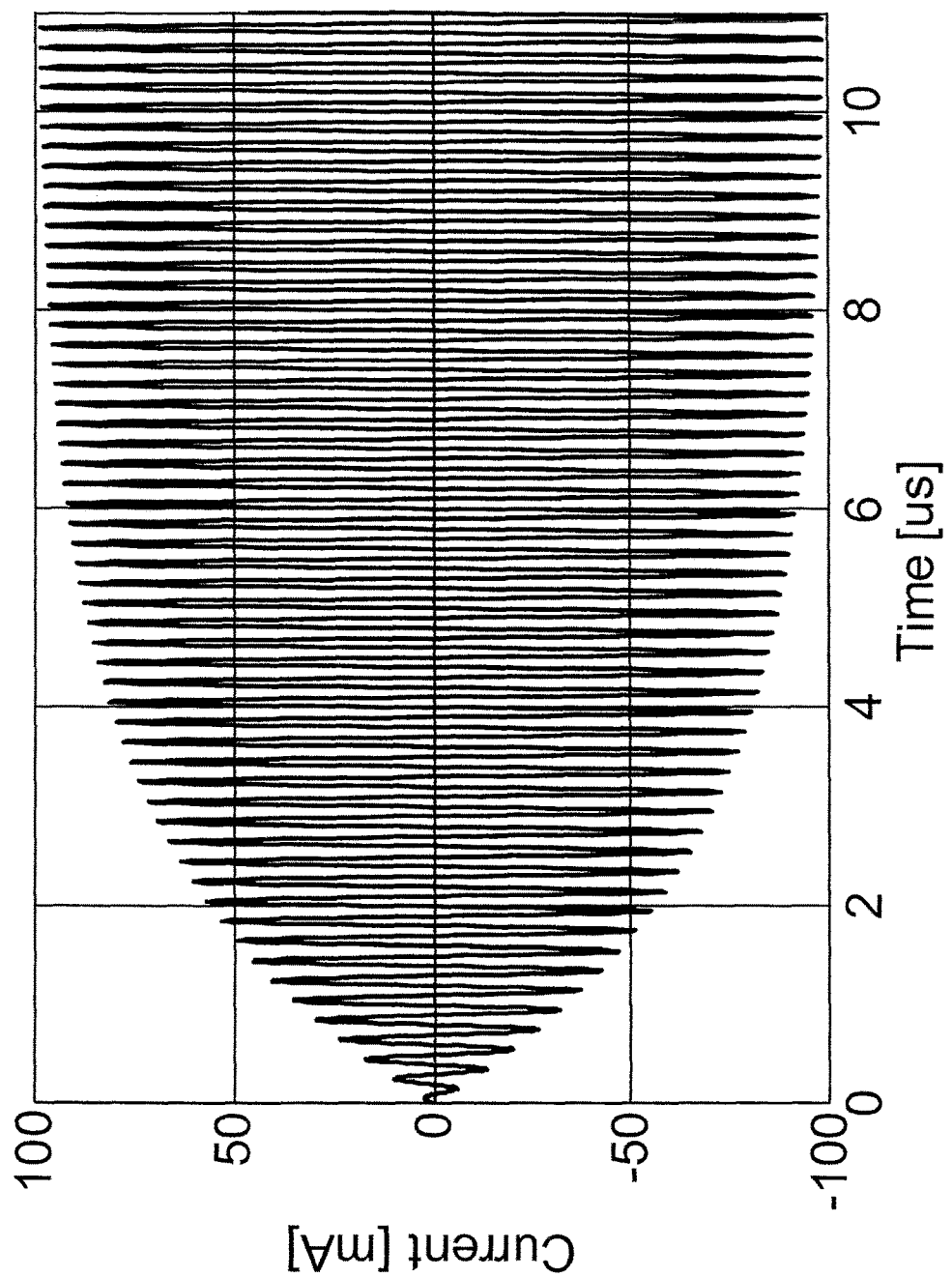
FIG. 7A is a plot showing a sinusoidal function response of the structure in accordance with FIG. 5 using FEM.
Figure 7B:
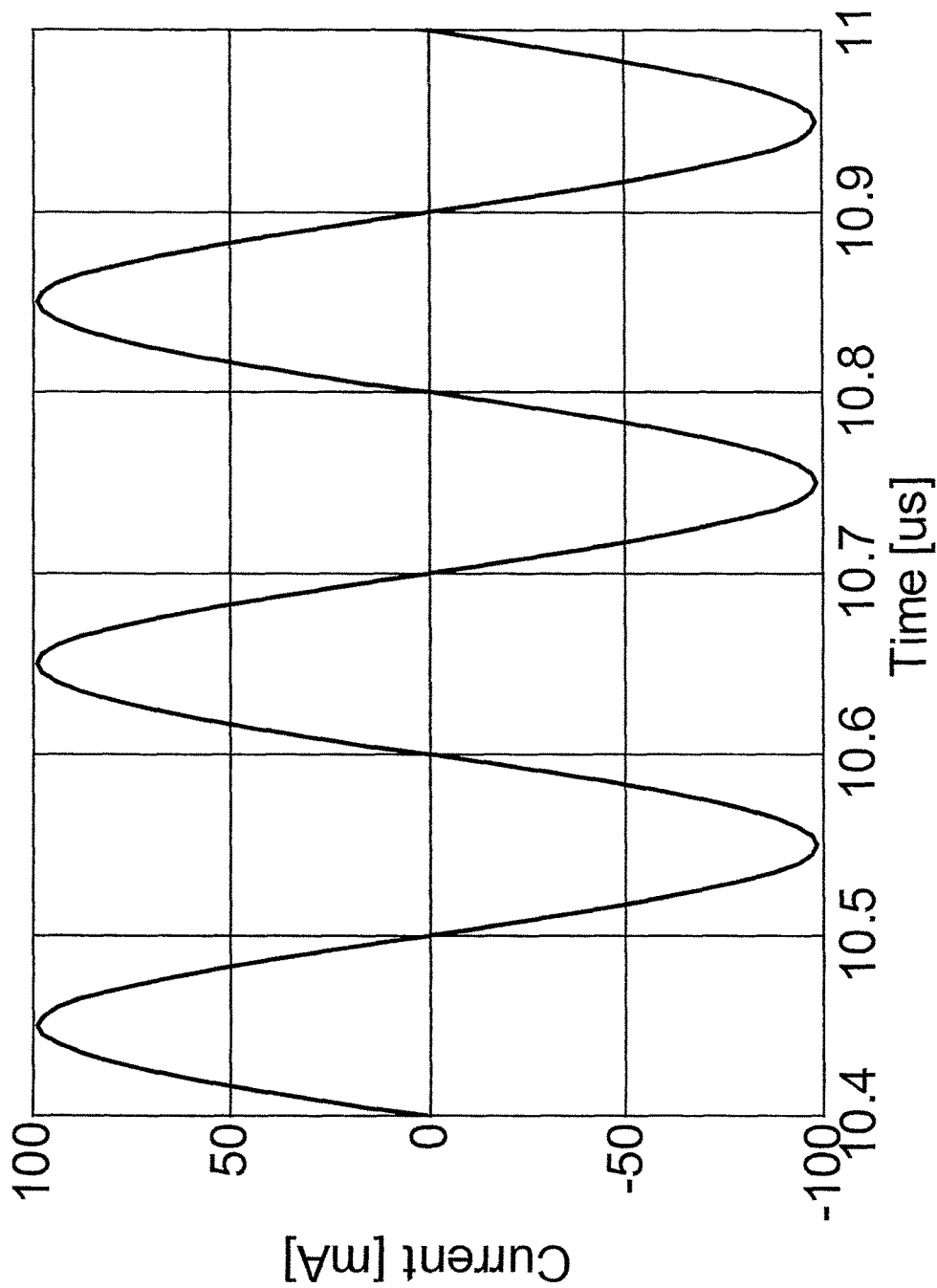
FIG. 7B is a portion of plot in FIG. 7A.
Figure 8A:
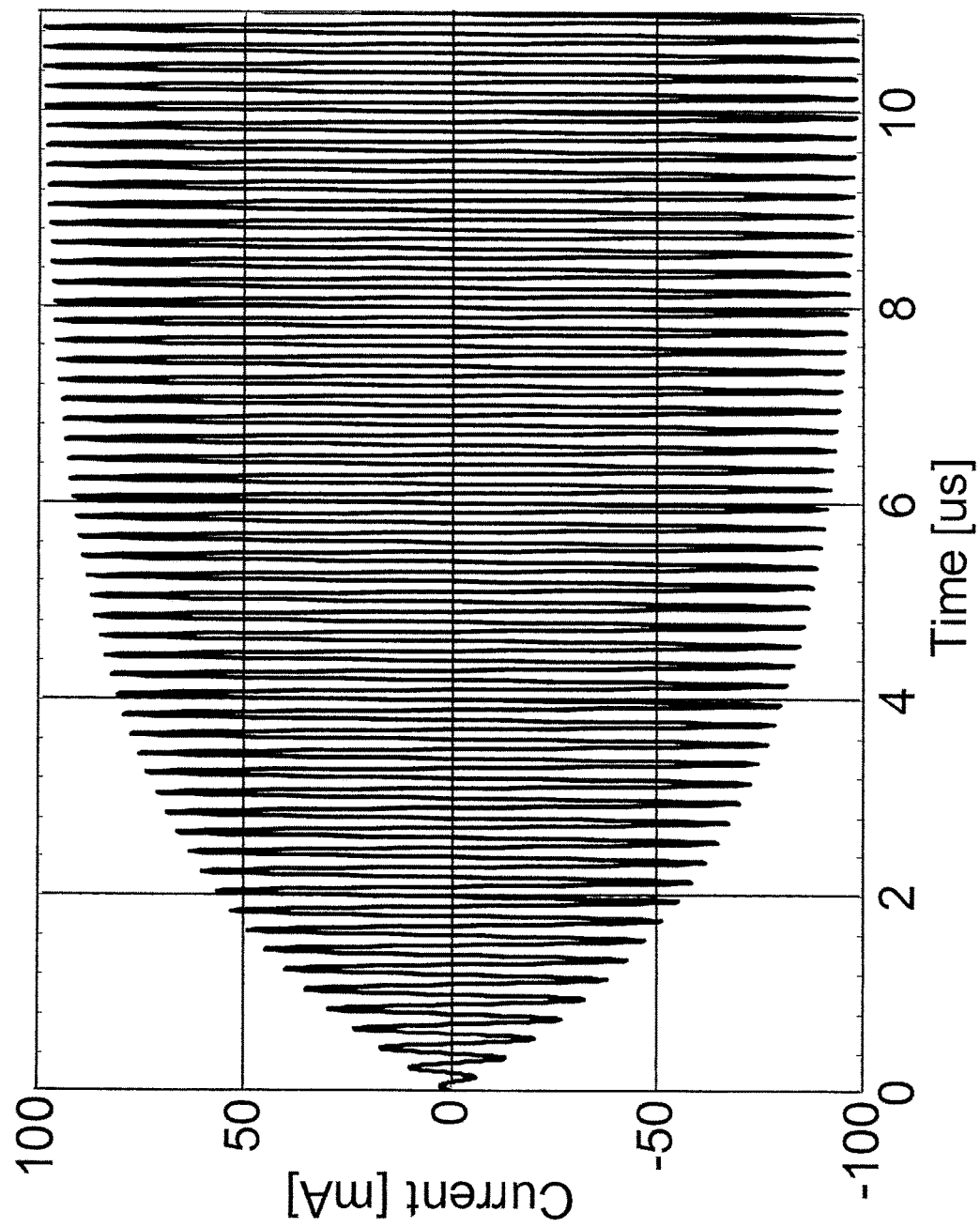
FIG. 8A is a plot showing a sinusoidal function response of the structure in accordance with FIG. 5 and one embodiment of the present invention.
Figure 8B:
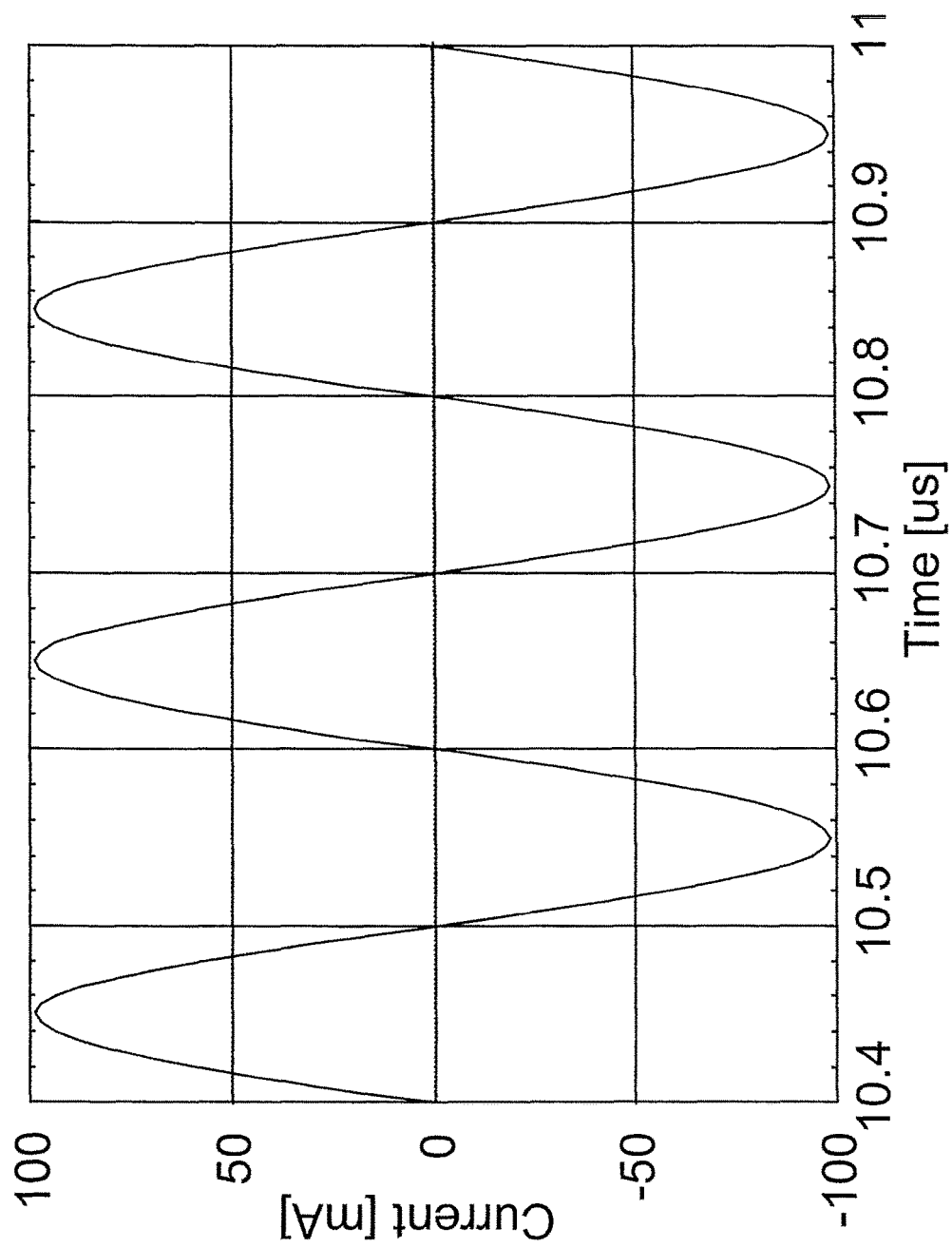
FIG. 8B is a portion of plot in FIG. 8A.
Figure 9:
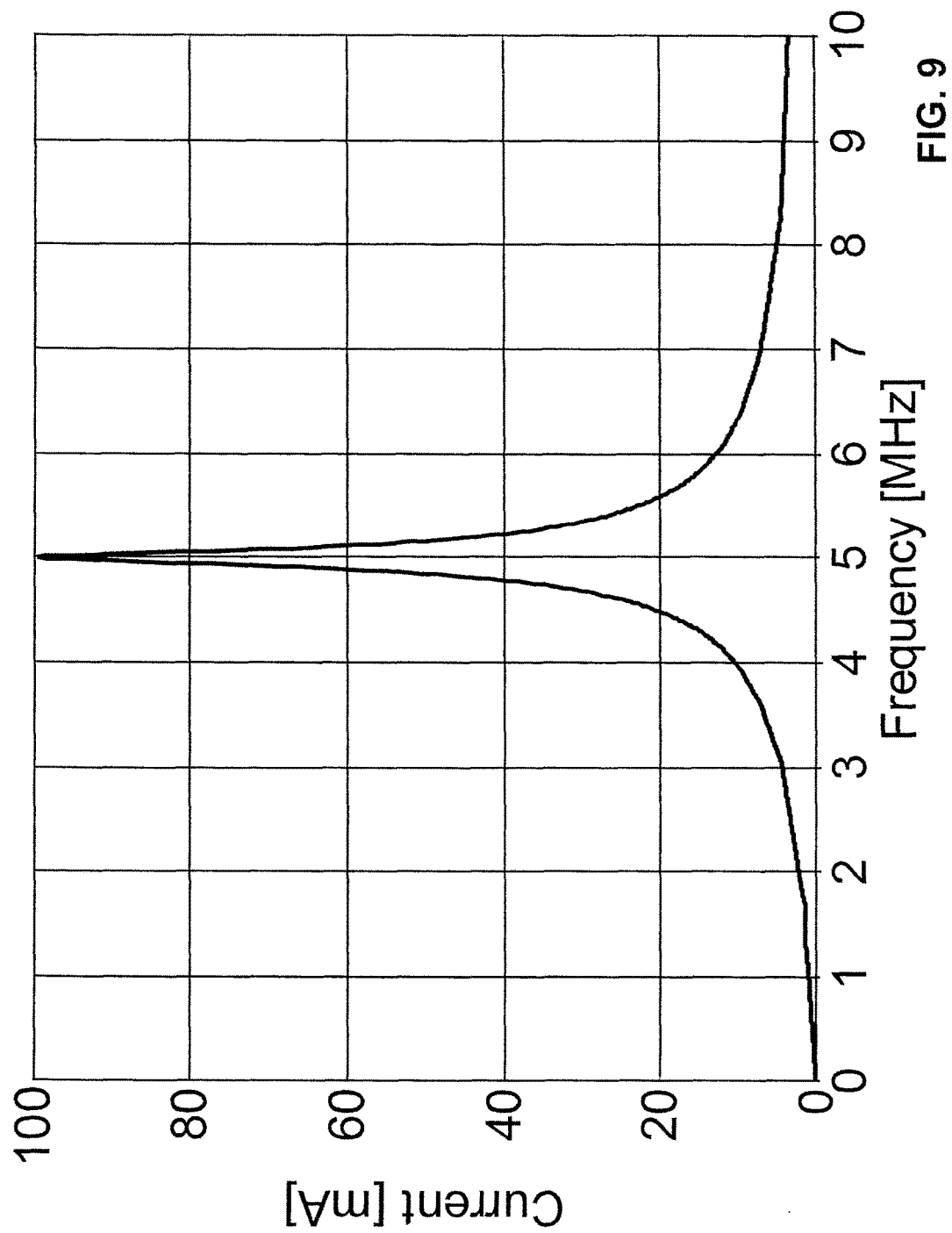
FIG. 9 is a plot showing the computed frequency vs. the amplitude of current of the structure in accordance with FIG. 5 and one embodiment of the present invention.

It can be seen from Table II that the time step size Δt has a significant effect on the numerical error between the results using the method for generating an EMF model (current method) and the conventional method. In the following analysis, the time step size is chosen as $1.0 \times 10^{-6}$ µs. The unit step function response of this example is first computed using time-domain FEM and FIG. 6 shows the computed current. To validate the method for generating an EMF model when the coil is excited by a sinusoidal voltage source, the solutions using transient FEM and the method for generating an EMF model are shown, respectively, in FIGS. 7A, 7B 8A and 8B, which are virtually identical. From the computed frequency versus the amplitude of current using the method for generating an EMF model as shown in FIG. 9, one can observe that the resonant frequency is 5 MHz, which is exactly the same as that obtained analytically by the formula $f=1/(2\pi\sqrt{LC})$ (here the inductance L is computed from magnetic static field computation using FEM). The comparison results of the method for generating an EMF model and the conventional method are list in Table III. It can be seen that the difference between the method for generating an EMF model and the conventional method is very small.

Figure 10:
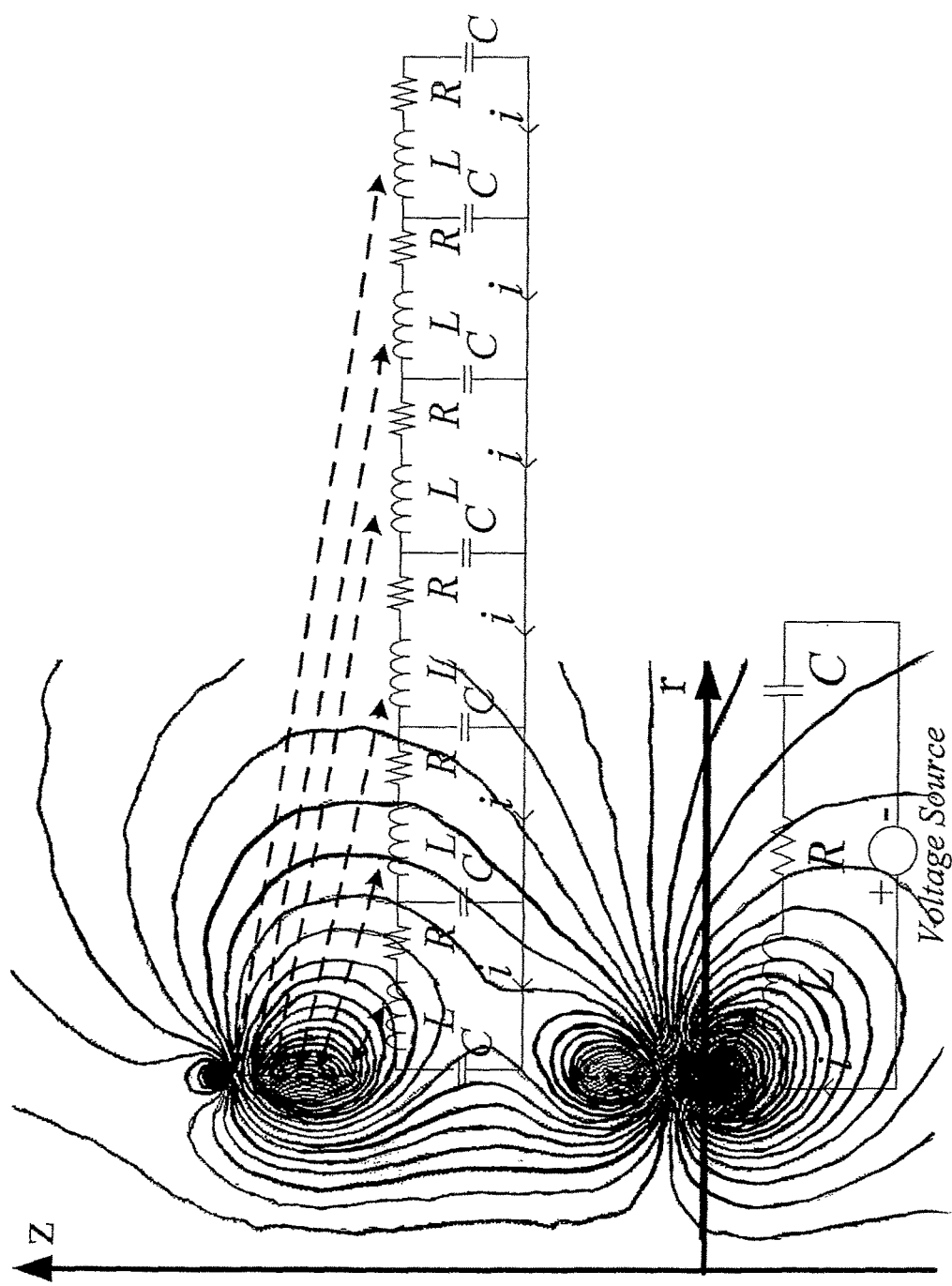
FIG. 10 is a schematic diagram illustrating a wireless transfer system at resonance and a coupling circuit.
Figure 11:
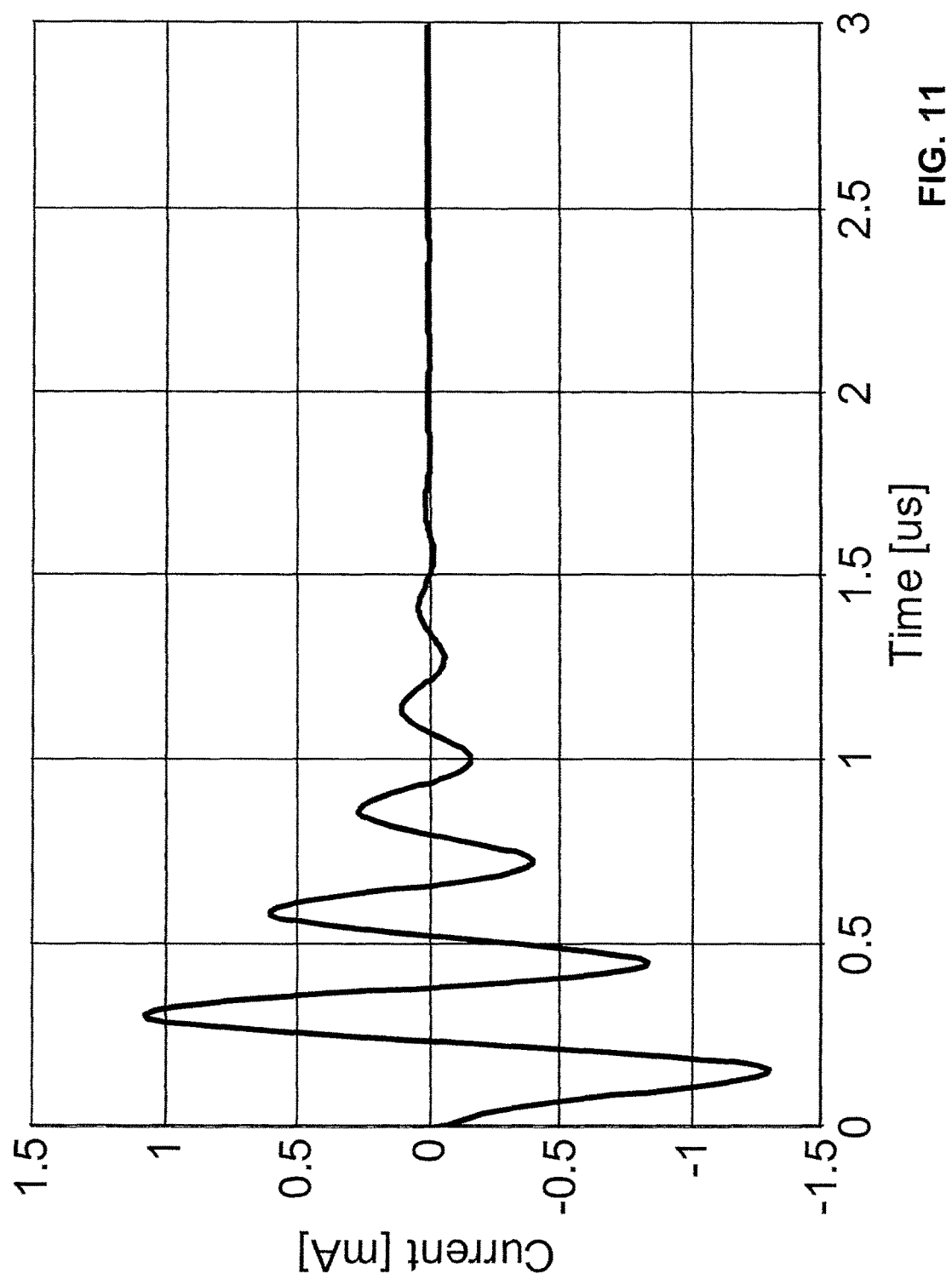
FIG. 11 is a plot showing a step function response of the structure in accordance with FIG. 10.
Figure 12:
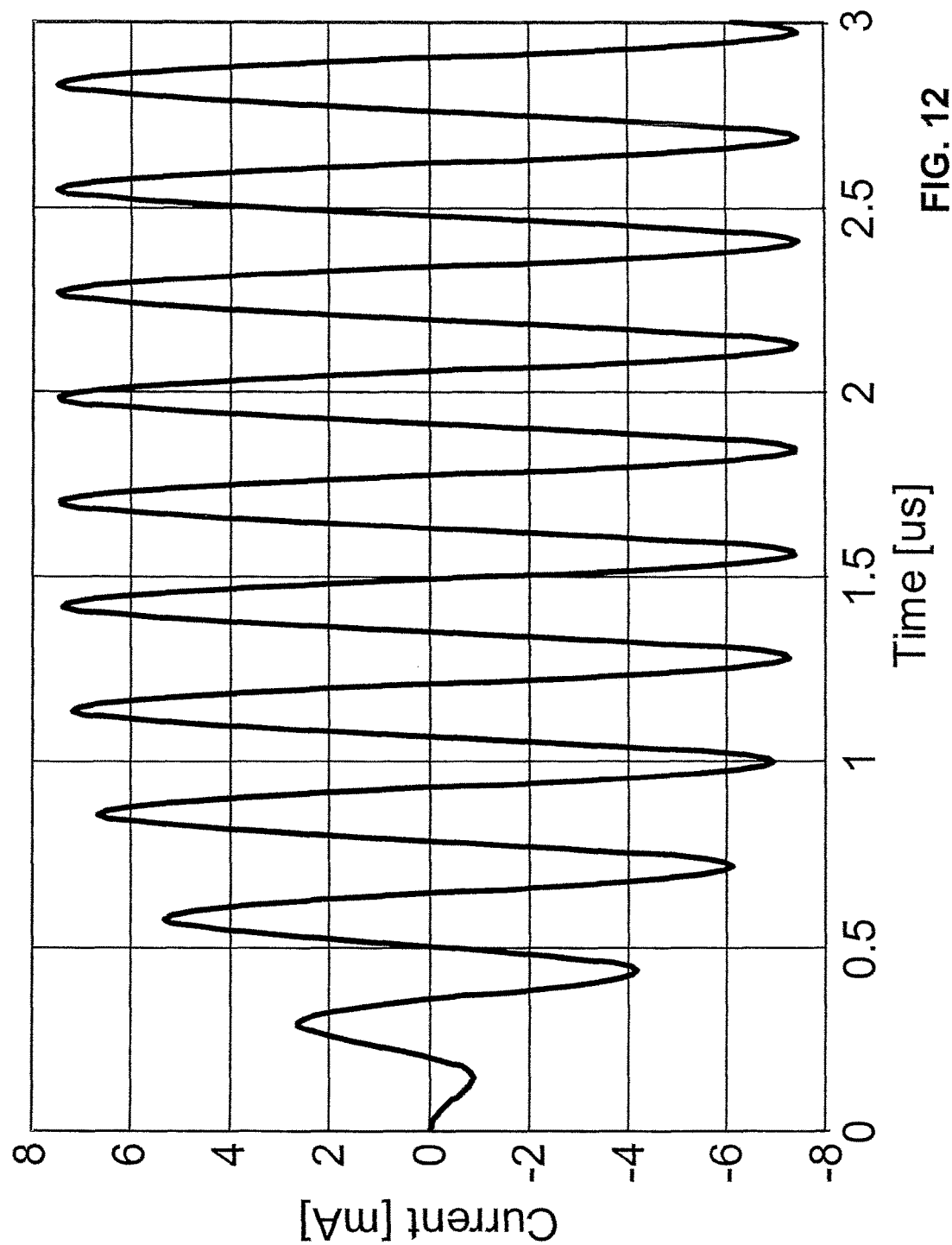
FIG. 12 is a plot showing a sinusoidal function response of the structure in accordance with FIG. 10 using FEM.
Figure 13:
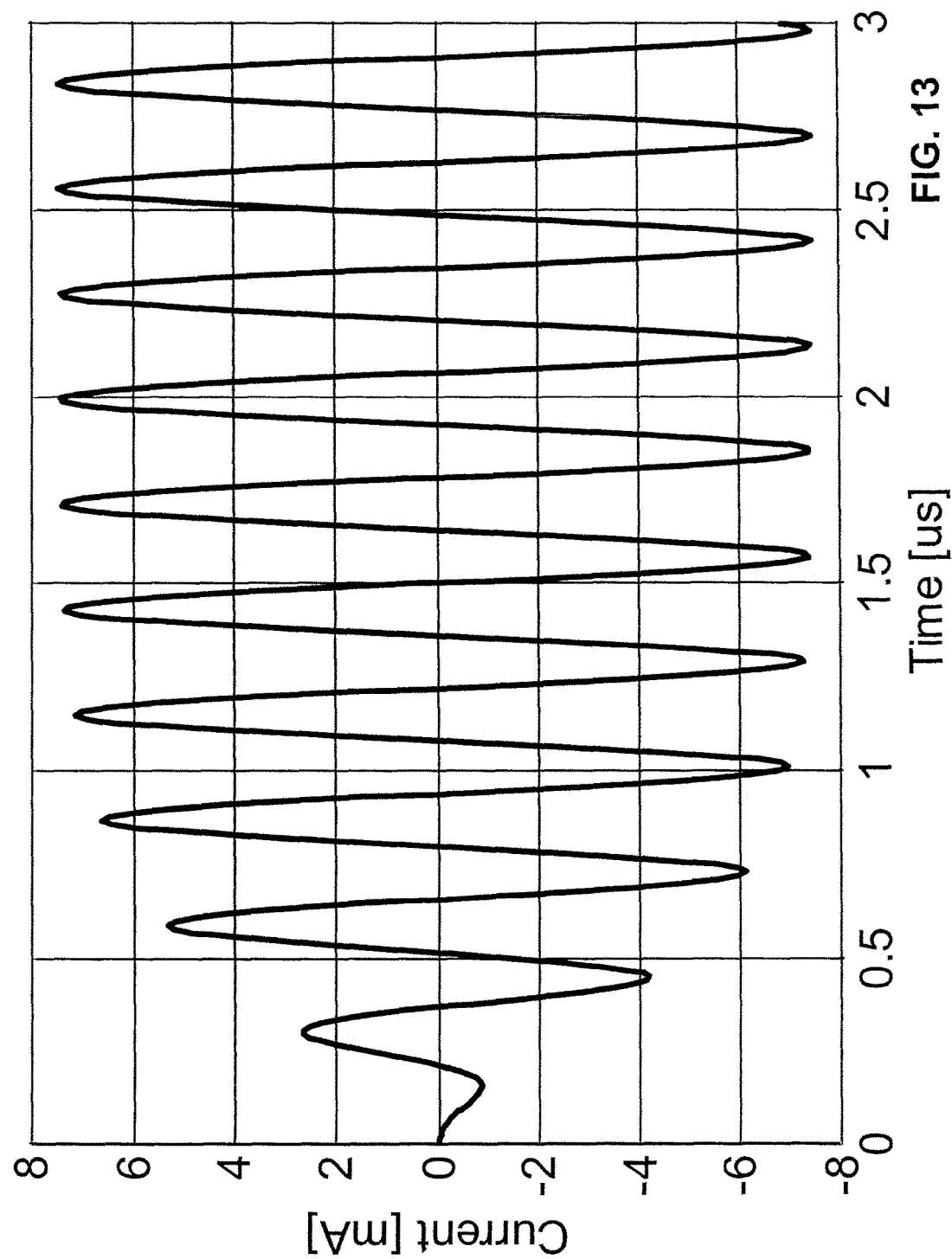
FIG. 13 is a plot showing a sinusoidal function response of the structure in accordance with FIG. 10 and one embodiment of the present invention.
Figure 14:
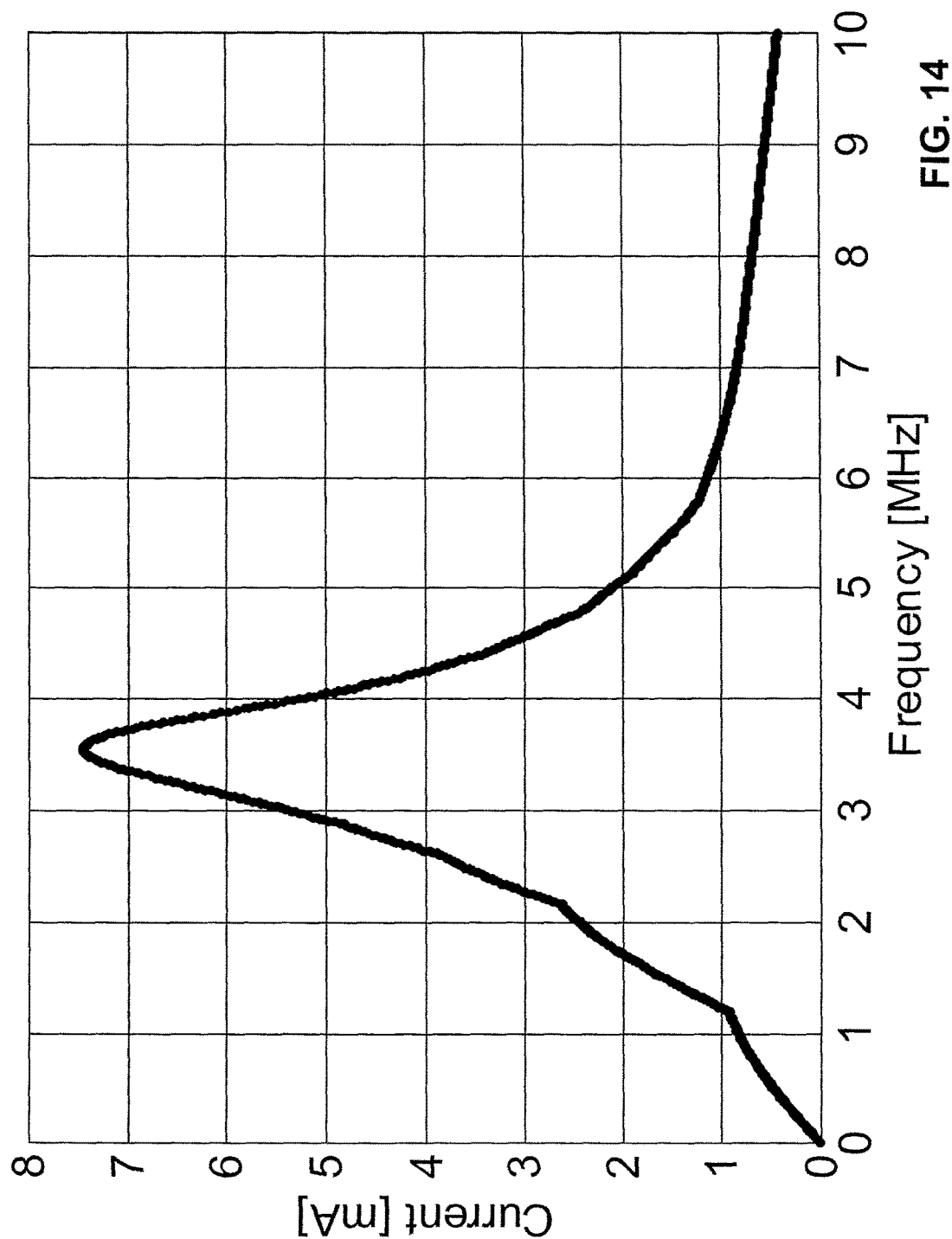
FIG. 14 is a plot showing the computed frequency vs. the amplitude of current of the structure in accordance with FIG. 10 and one embodiment of the present invention.

In another example, with reference to FIG. 10, there is shown a 4-coil wireless power transfer system. The transmitter coil and the receiver coil are both constructed by copper tape (which is a solid conductor and hence eddy-current effect is included in the analysis) and the parameters are listed in Table IV. In the FEM analysis, there are 59768 second-order triangular elements in the solution domain. A unit step function response is firstly computed using time stepping FEM as shown in FIG. 11. For comparison purpose, the system excited by a sinusoidal voltage source is also solved directly using time-stepping FEM. The solutions obtained using transient FEM and the method for generating an EMF model, as shown respectively in FIGS. 12 and 13, are almost the same. From the computed frequency versus the amplitude of current using the method for generating an EMF model as shown in FIG. 14, one can observe that the resonant frequency is 3.55 MHz. Comparison of the results of the method for generating an EMF model and the conventional method is listed in Table V. The difference between the method for generating an EMF model and the conventional method is very small.

TABLE IV

PARAMETERS OF THE TRANSMITTER COIL

| Radius of the circular coil | 81 mm |
| --- | --- |
| Width of the copper tap | 6.35 mm |
| Thickness of the copper tap | 0.04 mm |
| Number of turns | 6 |
| Number of layers | 1 |
| Gap between two turns | 2.38 mm |
| Compensating capacitance (C) | 320.5 pF |
| Distance between transmitter coil and receiver coil | 10 cm |

TABLE V

COMPARISON OF RESULTS OF THE METHOD FOR GENERATING AN EMF MODEL AND CONVENTIONAL METHOD

| | Conventional method | Current method | Difference |
| --- | --- | --- | --- |
| Resonant frequency | 3.55 MHz | 3.55 MHz | 0.0% |
| Current amplitude | 7.4476 mA | 7.4489 mA | 0.02% |

For the computation of performance of such example using the conventional method of frequency sweeping for about 200 frequencies on a Dell Precision T5500 computer, the total CPU time is about 5000 s. When using the method for generating an EMF model, the total CPU time is only 208 s. It can be seen from this example that the computing time of the method for generating an EMF model is less than 5% of that required by conventional method. The actual saving in computing resources is of course problem dependent but the example being described is a general and representative case and hence it is a good showcase of the significant merits of the method.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A computer-implemented method for generating an electromagnetic field (EMF) model for an electric device, the method comprising:
   establishing a time-domain finite data model associated with the electric device, wherein the time-domain finite data model defines a basic system representation of the electric device in the time-domain;
   utilizing the time-domain finite data model to determine a plurality of responses of the electric device, each response corresponding to a respective one of a plurality of sinusoidal excitations and representing an electrical characteristic of one or more electrical components of the electric device;
   generating an initial-value problem in the time-domain and representing the basic system representation of the electric device in the time-domain;
   discretizing at least one time variable in the initial-value problem with a time step, wherein the at least one time variable is discretized to obtain a plurality of discretized time variables of successive time stamps associated with the time step;
   obtaining a recursive formula associated with the initial-value problem and the discretized time variable;
   establishing a system matrix equation in accordance with the recursive formula; and
   generating an EMF model
      by combining the plurality of sinusoidal excitations using a transformation routine to approximate an input signal, wherein
         the transformation routine represents each of the plurality of sinusoidal excitations with a plurality of unit step functions to approximate the input signal, and
         the input signal is approximated as $$v_{sin}(t) \approx \sum_{k=0}^{K} [\sin(\omega k \Delta t) v_{square}(t - k \Delta t)](Dt),$$

wherein $\omega$ is angular frequency of the sinusoidal excitation, $v_{square}(t-kDt)$ is equal to a subtraction of step function $v_{step}(t-(k+1)Dt)$ from step function $v_{step}(t-kDt)$, and $\Delta t$ is time step size, for a wave width of $v_{square}(t-kDt)$; and
      by combining the plurality of responses, using the transformation routine, to determine an approximate representation of an EMF generated by the electric device in response to the input signal that is approximated from the plurality of sinusoidal excitations, wherein
         the transformation routine adds and/or subtracts the plurality of responses determined, based on the plurality of unit step functions representing the plurality of sinusoidal excitations, to determine the approximate representation of the EMF generated by the electric device, and
         the approximate representation of the EMF generated by the electric device is expressed as $$i(t) = v_s(t-\tau)u(t-\tau)s(\tau)\Big|_{\tau=0}^{\tau=\infty} - \int_0^\infty s(\tau)\frac{d[v_s(t-\tau)u(t-\tau)]}{d\tau}d\tau,$$

which is $$i_{sin}(t) = v_s(t-\tau)u(t-\tau)s(\tau)\Big|_{\tau=0}^{\tau=\infty} + \int_0^\infty s(\tau)V_{sm}\omega\cos\omega(t-\tau)u(t-\tau)d\tau$$

when the input signal is $$v_s(t) = V_{sm}\sin(\omega t)u(t),$$

where $u(t-t)$ is a step function and $s(t)$ denotes a step function response.

2. The method for generating an EMF model in accordance with claim 1, wherein the transformation routine is dependent on an association between the plurality of excitations and the EMF generated by the electric device.

3. The method for generating an EMF model for an electric device in accordance with claim 1, including obtaining a time-domain solution using a time-stepping finite-element function.

4. The method for generating an EMF model for an electric device in accordance with claim 1, including obtaining the initial-value problem using the backward Euler method.

5. The method for generating an EMF model for an electric device in accordance with claim 1, further comprising factorizing a coefficient matrix of the system matrix equation to obtain a factorized coefficient matrix.

6. The method for generating an EMF model for an electric device in accordance with claim 5, further comprising substituting the factorized coefficient matrix into the system matrix equation to obtain a solution of a particular time stamp.

7. The method for generating an EMF model for an electric device in accordance with claim 6, further comprising:
   updating the system matrix equation by replacing a plurality of discretized time variables with a plurality of corresponding discretized time variables of succeeding time stamps; and
   obtaining a solution for the succeeding time stamp.

8. The method for generating an EMF model for an electric device in accordance with claim 1, further comprising obtaining an electrical characteristic function of the one or more electrical components of the electric device.

9. The method for generating an EMF model for an electric device in accordance with claim 8, further comprising replacing at least one frequency variable of the electrical characteristic function to obtain results for different frequencies.

10. The method for generating an EMF model for an electric device in accordance with claim 1, wherein required time and accuracy of generating an EMF model for an electric device are controlled by replacing the time step with a different time step.

11. A system for generating an electromagnetic field (EMF) model for an electric device, the system comprising:
   a modeling module establishing a time-domain finite data model associated with the electric device, wherein
      the time-domain finite data model defines a basic system representation of the electric device in the time-domain, and
      the modeling module
         utilizes the time domain finite data model to determine a plurality of responses of the electric device, each response corresponding to one of a plurality of sinusoidal excitations and representing an electrical characteristic of one or more electrical components of the electric device,
         generates an initial-value problem in the time-domain and representing the basic system representation of the electric device in the time-domain,
         discretizes at least one time variable in the initial-value problem with a time step, wherein the at least one time variable is discretized to obtain a plurality of discretized time variables of successive time stamps associated with the time step, obtains a recursive formula associated with the initial-value problem and the discretized time variable, and establishes a system matrix equation in accordance with the recursive formula; and a processing module generating an EMF model by combining the plurality of sinusoidal excitations using a transformation routine to approximate an input signal, and by combining the plurality of responses, using the transformation routine, to determine an approximate representation of an EMF generated by the electric device in response to the input signal that is approximated from the plurality of excitations, wherein the transformation routine represents each of the plurality of sinusoidal excitations with a plurality of unit step functions to approximate the input signal, the input signal is approximated as $$v_{sin}(t) \approx \sum_{k=0}^{K} [\sin(\omega k \Delta t) v_{square}(t - k\Delta t)](Dt),$$

wherein $\omega$ is angular frequency of the sinusoidal excitation, $v_{square}(t-kDt)$ is equal to a subtraction of step functions $v_{step}(t-(k+1)Dt)$ from step function $v_{step}(t--kDt)$, and $\Delta t$ is time step size, for a wave width of $v_{square}(t-kDt)$; and carries out addition and/or subtraction with the plurality of responses determined, based on the plurality of unit step functions representing the plurality of sinusoidal excitations, to determine the approximate representation of the EMF generated by the electric device, and the approximate representation of the EMF generated by the electric device is expressed as $$i(t) = v_s(t-\tau)u(t-\tau)s(\tau)\Big|_{\tau=0}^{\tau=\infty} - \int_0^\infty s(\tau)\frac{d[v_s(t-\tau)u(t-\tau)]}{d\tau}d\tau,$$

which is $$i_{sin}(t) = v_s(t-\tau)u(t-\tau)s(\tau)\Big|_{\tau=0}^{\tau=\infty} + \int_0^\infty s(\tau)V_{sm}\omega\cos\omega(t-\tau)u(t-\tau)d\tau$$

when the input signal is $$v_s(t) = V_{sm} \sin(\omega t)u(t),$$

where $u(t-t)$ is a step function and $s(t)$ denotes a step function response.

12. The system for generating an EMF model in accordance with claim 11, wherein the transformation routine is dependent on an association between the plurality of excitations and the EMF generated by the electric device.

13. The system for generating an EMF model for an electric device in accordance with claim 11, wherein a time-domain solution is obtained using a time-stepping finite-element function.

14. The system for generating an EMF model for an electric device in accordance with claim 11, wherein the processing module obtains an electrical characteristic function of the one or more electrical components of the electric device, and replaces at least one frequency variable of the electrical characteristic function to obtain different results for different frequencies.

* * * * *